United States Patent [19]

Huang et al.

[11] Patent Number: 6,100,623

[45] Date of Patent: Aug. 8, 2000

[54] PIEZOELECTRIC ACTUATOR FOR CONTROL AND DISPLACEMENT SENSING

[75] Inventors: Fu-Ying Huang; Wayne Isami Imaino, both of San Jose; Jiann-Chang Lo, Cupertino, all of Calif.

[73] Assignee: International Business Machines Corporation, Armonk, N.Y.

[21] Appl. No.: 09/139,541

[22] Filed: Aug. 25, 1998

[51] Int. Cl.[7] .................................................. H01L 41/08
[52] U.S. Cl. ..................................... 310/317; 310/316.01
[58] Field of Search ............................... 310/316.01, 317, 310/318

[56] References Cited

U.S. PATENT DOCUMENTS

| | | | |
|---|---|---|---|
| 5,384,507 | 1/1995 | Takada et al. | 310/317 |
| 5,557,156 | 9/1996 | Elings | 310/316 |
| 5,568,003 | 10/1996 | Deck | 310/316 |
| 5,644,512 | 7/1997 | Chernoff et al. | 702/85 |

OTHER PUBLICATIONS

Zhi–Min, Y., et al. "Controller design criteria for the dual–stage disk actuator system", Proc. SPIE–International Society for Optical Engineering (USA), V 2101, No. 1, pp. 305–308, Nov. 1993.

Guo, W., "Dual stage actuators for high density rotating memory devices", IEEE Trans. Magn. (USA), V. 34, No. 2, pp. 450–455, Mar. 1998.

Janocha H., et al., "Principle of smart piezoactuators", Actuator 96, 5th International Conference on New Actuators, Jun. 26–28, 1996, Breman, Germany.

Near, C.D., "Piezoelectric actuator technology", SPIE International Society for Optical Engineering, V. 2717, pp. 246–258, Apr. 1998.

Chiang, W. W., "Piezoelectric modal sensor/actuator devices for DASD active damping vibration control", IBM Technical Disclosure Bulletin, V. 34, No. 4B, pp. 53–54, Sep. 1991.

Kirtley, J. R., "Active vibration damping of scanning tunneling microscope", IBM Technical Disclosure Bulletin, V. 31, No. 2. pp. 426–429, Jul. 1988.

*Primary Examiner*—Nestor Ramirez
*Assistant Examiner*—Peter Medley
*Attorney, Agent, or Firm*—Lumen Intellectual Property Services

[57] ABSTRACT

A system and method for using a piezoelectric (PZT) element to simultaneously actuate and sense a displacement of an arm assembly; e.g., an assembly for reading and writing data in a storage medium. The simultaneous actuating and sensing function of the PZT is achieved by adding a high-frequency excitation to a control signal which actuates the PZT. The control signal and the high-frequency excitation cause deformation of the PZT translating into arm displacement and cause the generation of an electrical response signal by the PZT. A bridge which simulates the reactance/resistance of the PZT receives the response signal and derives from it the displacement of the arm assembly. Suitable compensation techniques for active control of the PZT and for mitigation of mechanical vibrations and other disturbances experienced by the arm assembly may then be implemented based on the displacement.

13 Claims, 4 Drawing Sheets

PIEZOELECTRIC ACTUATOR FOR CONTROL AND DISPLACEMENT SENSING

FIELD OF THE INVENTION

This invention relates generally to piezoelectric devices exhibiting the self-sensing effect, and in particular to piezoelectric actuators used in arm assemblies for simultaneous control and displacement sensing.

BACKGROUND OF THE INVENTION

We are witnessing continued progress in the miniaturization of mechanical structures such as arm assemblies for disk drives, bimorph beams and other constructions employing mechanical arms. This move to ever smaller physical dimensions has to be accompanied by corresponding advances in devices controlling the deflections or displacements of the arm and units which sense these movements, e.g., for feedback purposes. Thus, in the field of disk drives, fine-tuning of the displacement of the tip of the arm bearing the read/write head is very important. High-bandwidth servo actuators are crucial to achieving large track densities in rotating magnetic storage devices. General ways of achieving higher bandwidth include the use of high specific stiffness materials such as AlBC or Albumet for making the arms, employment of compound actuators and application of active/passive damping techniques.

The use of dual-stage actuation systems having a primary actuator, e.g., a VCM coil, for executing large movements and a secondary actuator, e.g., a piezoelectric element PZT, for fine-tuning and tracking is well-known in the art. The small PZT miliactuator has higher vibrational modes than the VCM due to scaling. Descriptions of such systems are found in scientific and patent literature. Some representative references include Ahi-Min Y., et al. "Controller Design Criteria for the Dual-Stage Disk Actuator System", Proc. SPIE—International Society for Optical Engineering (USA), Vol. 2101, No. 1, 1993, pp. 305–8 and Guo, W., et al., "Dual Stage Actuators for High Density Rotating Memory Devices", IEEE Trans. Magn. (USA), Vol .34, No. 2, pt. Mar. 1, 1998, pp. 450–5.

A PZT transducer is suitable for actuation purposes and is generally controlled by applying to it a suitable control voltage. In response, the PZT changes its physical dimensions causing a deflection or displacement of the arm. Additionally, certain PZTs such as piezoelectric ceramics are inexpensive and combine simultaneously actuation and sensing capabilities. In particular, such "smart" PZTs or self-sensing PZTs react to a change in mechanical load by changing their electrical input parameters. They can thus sense the deformation of the PZT or deflection of the arm while at the same time performing actuator functions. Self-sensing PZTs are described in prior art references such as Janocha H., et al. "Principle of Smart Piezoactuators", Actuator 96, 5th International Conference on New Actuators", Jun. 26–28, 1996, Bremen, Germany, and Near C. D., "Piezoelectric Actuator Technology", SPIE International Society for Optical Engineering, Vol. 2717, April 1998, pp. 246–58. Additional prior art references teach the use of PZTs as devices for active damping of vibrating structures or arms. These applications of PZTs are described, e.g., by W. W. Chiang, et al. in "Piezoelectric Modal Sensor/Actuator Devices for DASD Active Damping Vibration Control", IBM Technical Disclosure Bulletin, Vol. 34, No. 4B, September 1991, pp. 53–4 and by J. R. Kirtley, et al. in "Active Vibration Damping of Scanning Tunneling Microscope", IBM Technical Disclosure Bulletin, Vol. 31, No. 2, July 1988, pp. 426–9.

A PZT element used as a miliactuator for deflection control as well as sensing has to be compensated for external influences of temperature, moisture and any electrical fields. Lack of proper compensation of the miliactuator will result in inferior sensing performance or even make it impossible to separate the driving signal causing the deformation from the self-sensing signal. Only when the self-sensed signal is accurate can it be used for compensating the arm assembly, e.g., compensation of vibrational modes.

OBJECTS AND ADVANTAGES

Accordingly, it is a primary object of the present invention to provide a system and a method for actuating and sensing the displacement of an arm structure by a PZT element. The method and system include a compensation circuit and technique for proper separation of the deformation and self-sensing signals enabling one to control the PZT and derive precise deflection information.

It is another object of the invention to provide a circuit capable of rapidly adjusting the PZT for external parameters. The circuit of the invention is simple in construction and easy to implement.

Yet another object of the invention is to provide a method for processing the response signal from the PZT to compensate for the arm's mechanical characteristics. In particular, it is an object of the invention to increase the operating bandwidth of the arm assembly by applying a suitable compensation signal to the arm assembly. A further related advantage is the ability to accommodate higher trackpitch in storage media which use the arm assembly controlled according to the invention in a data storage system.

These and other advantages of the invention will become apparent upon reading the detailed description.

SUMMARY

These objects and advantages are attained by a system for actuating and sensing a displacement of an arm assembly, and specifically of an element such as a read/write head mounted on the arm assembly for reading and writing data in a storage medium. The system uses a piezoelectric (PZT) actuator mounted on the assembly and preferably acting as a secondary actuator. The system has a high-frequency source for generating a high-frequency excitation and a control for generating a control signal for actuating the PZT. A driving stage connected to the high-frequency source, the control and the PZT combines the high-frequency excitation and the control signals and applies them to the PZT. The control signal and the high-frequency excitation cause deformation of the PZT and hence the arm displacement as well as an electrical response signal from the PZT. A bridge circuit connected to the driving stage and the PZT receives the response signal and derives from it the displacement. The bridge circuit has a voltage-controlled element, typically a voltage-controlled capacitor and a voltage-controlled resistor, for simulating the PZT. In fact, the element simulating the PZT is connected in a reference arm of the bridge and the PZT itself is connected in an actuator arm of the bridge.

The bridge circuit uses a high-frequency difference amplifier for deriving an adjustment signal and delivering it to the voltage-controlled element such that the latter properly mimics the electrical response parameters of the PZT.

In addition, the system has a compensating circuit connected to the bridge circuit and the driving stage for deriving a compensation signal. The compensation signal is used for active control of the PZT and is delivered for that purpose to the driving stage. Preferably, the compensation signal includes at least a damping correction, or a stiffening correction or an inertia correction. Most preferably, all three correction terms are used.

The method of the invention utilizes the bridge circuit for accurately sensing the displacement of the arm or the read/write head mounted thereon. By deriving an accurate self-sensing signal the arm assembly can be compensated for mechanical vibration and other disturbances.

The invention will be better understood upon reading the following detailed description which makes reference to the attached drawing figures.

DETAILED DESCRIPTION

Figure 1:
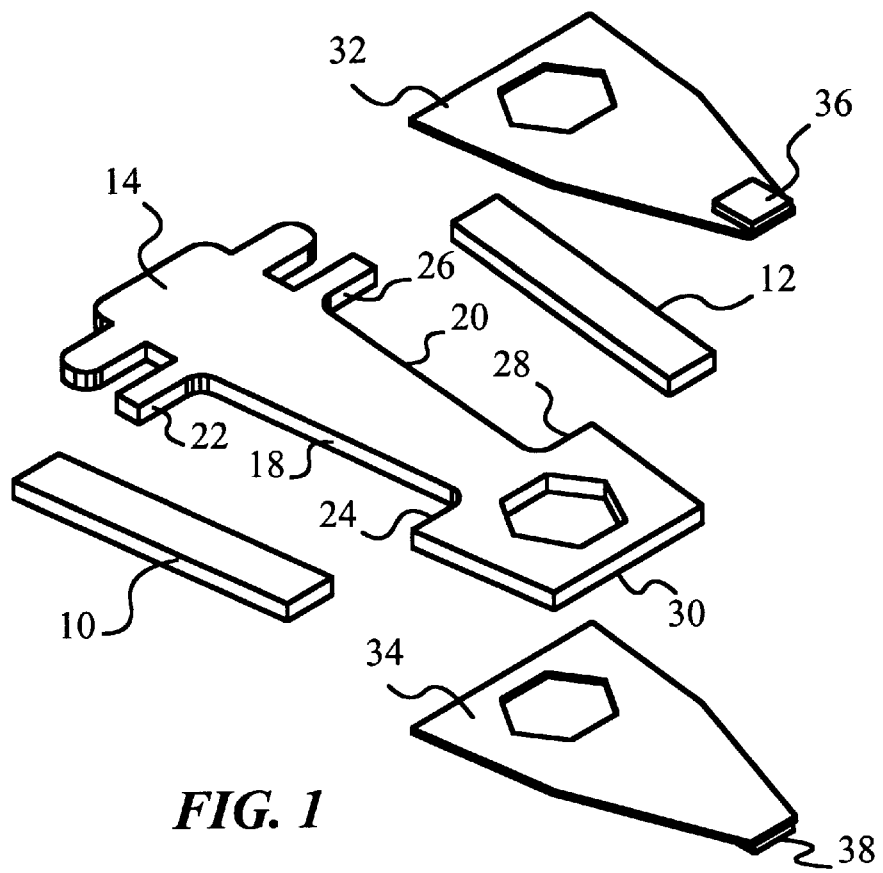
FIG. 1 is an isometric exploded view of a portion of an arm assembly using two PZT elements.
Figure 2:
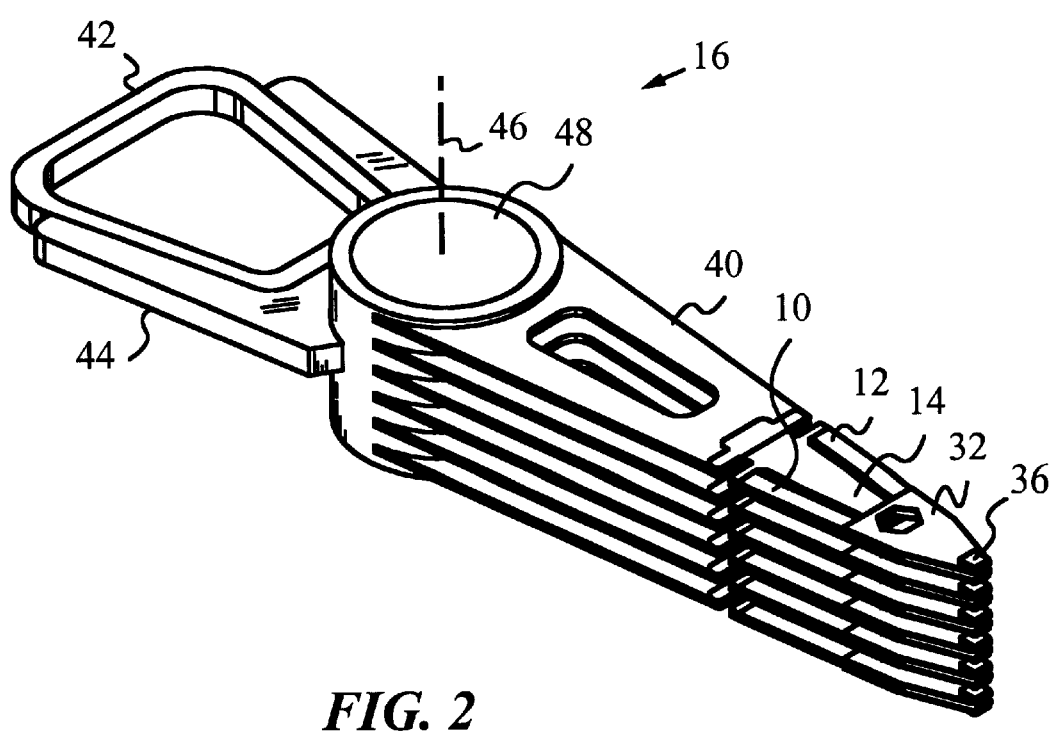
FIG. 2 is an isometric view of a complete arm assembly using the PZT elements for secondary actuation.
Figure 3:
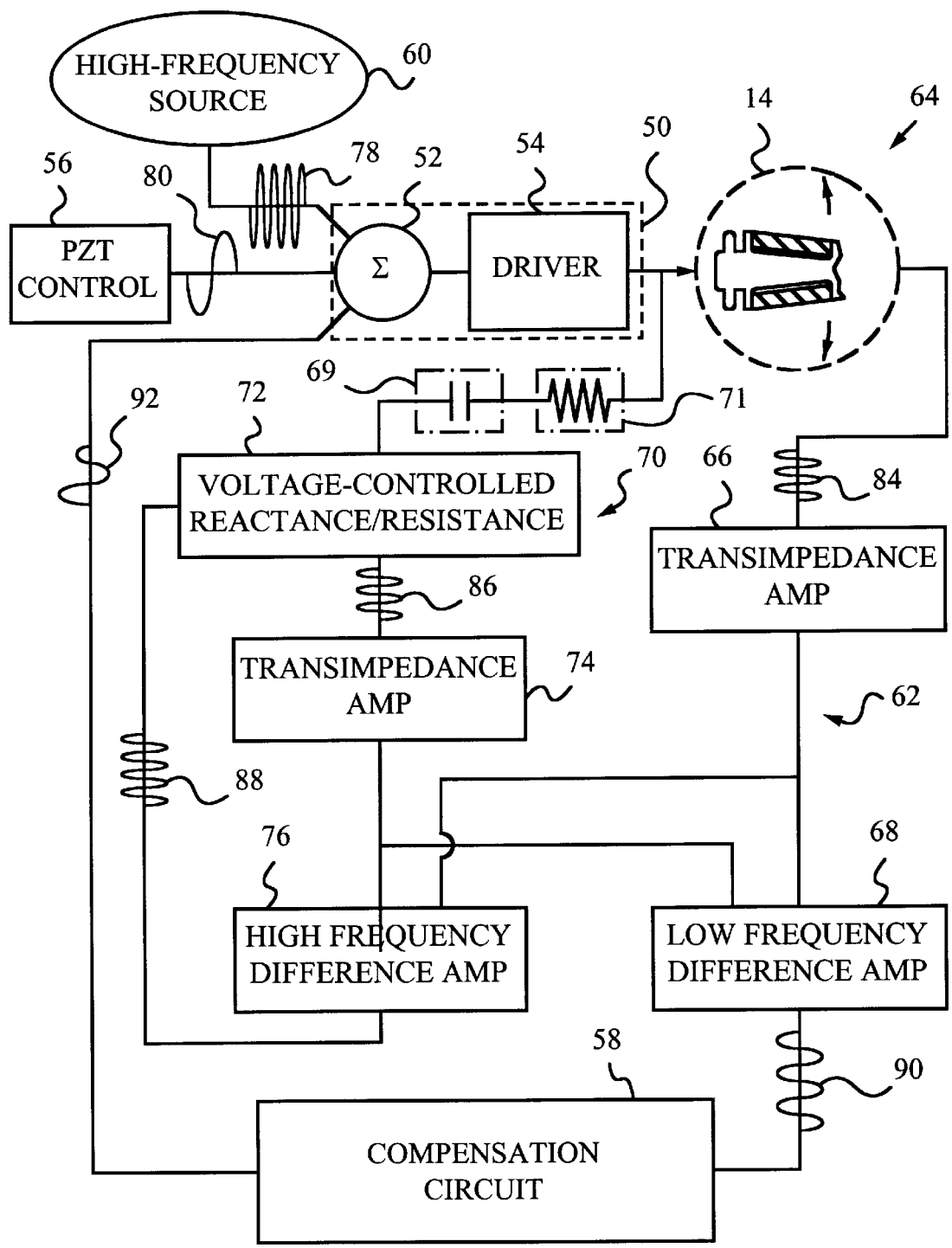
FIG. 3 is a block diagram of a circuit for controlling and sensing the response of the PZTs.

A preferred embodiment of an arm assembly 16 for use in a system according to the invention is shown in FIGS. 1 and 2. FIG. 3 shows a preferred driver/controller circuit for controlling the second stage of arm assembly 16.

Specifically, FIG. 1 shows two piezoelectric (PZT) elements or actuators 10, 12 and an arm portion or miliactuator 14 of arm assembly 16 (see FIG. 2). PZTs 10, 12 are typically made of a piezoelectric ceramic material or any other suitable material exhibiting the self-sensing capability. Miliactuator 14 has two lateral recesses 18, 20 with end walls 22, 24 and 26, 28 respectively. PZTs 10, 12 are fitted in recesses 18, 20 such as to cause deflection or displacement of miliactuator 14 when they are deformed. This occurs because in extending or contracting PZTs 10, 12 will exert a force on end walls 22, 24 and 26, 28 respectively.

Miliactuator 14 also has a mounting portion 30 for attaching an upper slider 32 and a lower slider 34. Sliders 32, 34 carry read/write heads 36, 38 at their tips and are attached to mounting portion 30 by any suitable mounting technique. In the case shown sliders 32, 34 are attached by a press fit.

As shown in FIG. 2, arm assembly 16 uses two miliactuators 14 with PZTs 10, 12 as miliactuators or secondary actuators for each one of its six arms 40. A VCM coil 42 mounted in a cradle 44 is provided for rotating arms 40 about a central axis 46 on a bearing 48. This type of primary actuation arrangement is well-known in the art.

Every miliactuator 14 is mounted at the end of a corresponding arm 40. In this manner, each miliactuator 14 forms the second stage of each arm 40. Appropriate electrical connections (not shown) are made to each miliactuator 14, and specifically to PZTs 10, 12.

FIG. 3 shows a block diagram of the electronics or driver/controller circuitry required to operate PZTs 10, 12 of miliactuator 14. Of course, a person of average skill in the art will be able to design many different circuits performing the required functions.

A driving stage 50 generally consisting of a summing stage 52 and a voltage driver 54 is connected to PZTs 10, 12 in miliactuator 14. The input of driving stage 50 or summing stage 52 is connected to a high-frequency source 60, a PZT control 56 and a compensation circuit 58. The output of summing stage 52 is connected to the input of driver 54.

Miliactuator 14 is connected in an actuator arm 62 of a bridge circuit 64. Actuator arm 62 of bridge circuit 64 also has a transimpedance amplifier 66 and a low-frequency difference amplifier 68 connected in series with miliactuator 14. A reference arm 70 of bridge circuit 64 is formed between the output of driver 54 and low-frequency difference amplifier 68. Reference arm 70 has a voltage-controlled element 72, specifically a voltage-controlled capacitor and a voltage-controlled resistor, which simulates PZTs 10, 12. In series with element 72 is a transimpedance amplifier 74 and a high-frequency difference amplifier 76. The output of high-frequency difference amplifier is connected to element 72 for feedback purposes. The output of bridge circuit 64, or the output of low-frequency difference amplifier 68 is connected to compensation circuit 58. Preferably, compensation circuit 58 is of the type capable of deriving a damping correction, a stiffening correction and an inertial conditioning correction based on the signal received from low-frequency difference amplifier 68. In some applications, however, only one or two of these corrections may be used.

During operation high-frequency source 60 delivers a high-frequency excitation 78 to driving stage 50. The frequency of excitation 78 is sufficiently high above the resonant modes of arm assembly 16 that the latter is not affected by excitation 78. At the same time, PZT control 56 delivers a control signal 80 for actuating miliactuator 14. Excitation 78 and control signal 80 are combined by summing stage 52 and applied to miliactuator 14 by driver 54. The amplitude of excitation 78 is chosen such that the sum of control signal 80 and excitation 78 does not cause saturation or non-linear behavior of the stages of arm assembly 16 and of miliactuator 14 in particular.

Figure 4:
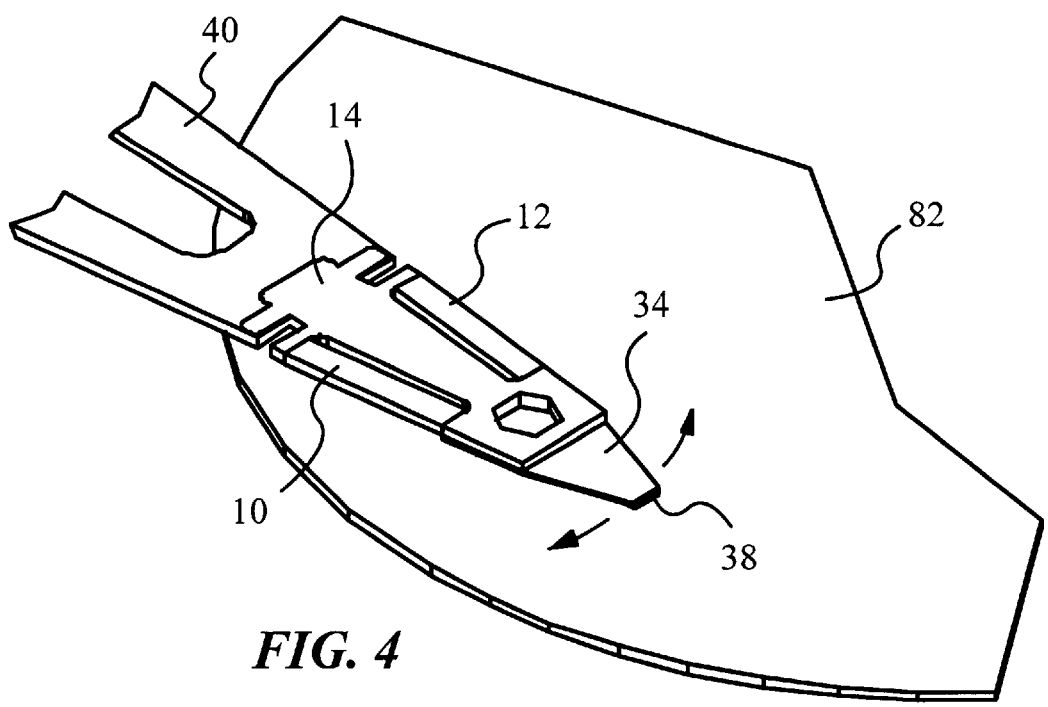
FIG. 4 is an isometric view illustrating the implementation of the PZTs for secondary actuation.

Control signal 80 causes a deformation of PZTs 10, 12 which causes a bending miliactuator 14. The bending translates into a displacement of the tip of arm assembly 16 carrying sliders 32, 34. FIG. 4 illustrates the resulting displacement of head 38 of slider 34 over a storage medium 82; in this case a rotating disk. This displacement is used for fine adjustments and tracking of data tracks located in storage medium 82.

Excitation 78 and control signal 80 passed through to PZTs 10, 12 to produce an electrical response signal 84. In particular, response signal 84 is the current flowing out of PZTs 10, 12. This current reflects the dynamic impedance of PZTs 10, 12 due to applied stresses.

Response signal 84 passes through transimpedance amplifier 66 which amplifies the current component of response signal 84 and passes it on to low-frequency difference amplifier 68 and high-frequency difference amplifier 76.

In reference arm 70 both control signal 80 and excitation 78 pass through voltage-controlled element 72 which simulates by its capacitance and resistance the effect of miliactuator 14. Generally, a PZT element has a very high resistance, e.g. about $10^7$ ω. In addition, 90% or more of the impedance of a PZT is accounted for by a capacitive model.

Hence, a PZT is best modeled by the capacitive and resistive portions of element 72, were the resistive portion accounts for the very slight leakage current.

A response signal 86 of element 72 has to match response signal 84 of PZTs 10, 12 for proper simulation of their nominal characteristics. In fact, the simulation has to be very precise in order to account for temperature effects and other physical parameters affecting the operation of PZTs 10, 12.

For the above purpose, a simulated response signal 86 is amplified by transimpedance amplifier 74 and sent to low-frequency difference amplifier 68 as well as high-frequency difference amplifier 76. The two difference amplifiers 68, 76 compare the high and low frequency components of response signal 84 and the simulated signal 86. In particular, high-frequency amplifier 76 differentiates the high-frequency components of response signals 84 and 86 to yield an adjustment signal 88. Adjustment signal 88 is a voltage signal fed back to element 72 to adjust its capacitance and resistance such that it exactly matches the nominal characteristics of PZTs 10, 12. Meanwhile, low-frequency difference amplifier 68 differentiates response signals 84 and 86 to yield a signal 90 indicating the deflection of miliactuator 14.

In practical applications it may be preferable to use a nominal capacitance and resistance in conjunction with voltage-controlled element 72. When a nominal capacitance 69 and a nominal resistance 71 are used, as shown in dashed and dotted lines in FIG. 3, element 72 only needs to provide for relatively small resistance and capacitance adjustments to achieve proper simulation of PZTs 10, 12.

Since compensating circuit 58 is connected to bridge circuit 64 and in particular to the output of low-frequency difference amplifier 68, it receives signal 90. Since PZTs 10, 12 are mounted on arm assembly 16, signal 90 is also affected by the vibrational modes of arm assembly 16. Thus, compensating circuit 58 uses signal 90 to derive a compensation signal 92 for arm assembly 16. Compensation signal 92 is supplied to summing stage 52 and added to update control signal 80. Compensation signal 92 preferably includes at least a damping correction, or a stiffening correction or an inertial conditioning correction. Preferably, all three correction terms are used. The method of deriving these corrections from the deflection information carried by signal 90 is well-known in the art.

Figure 5A:
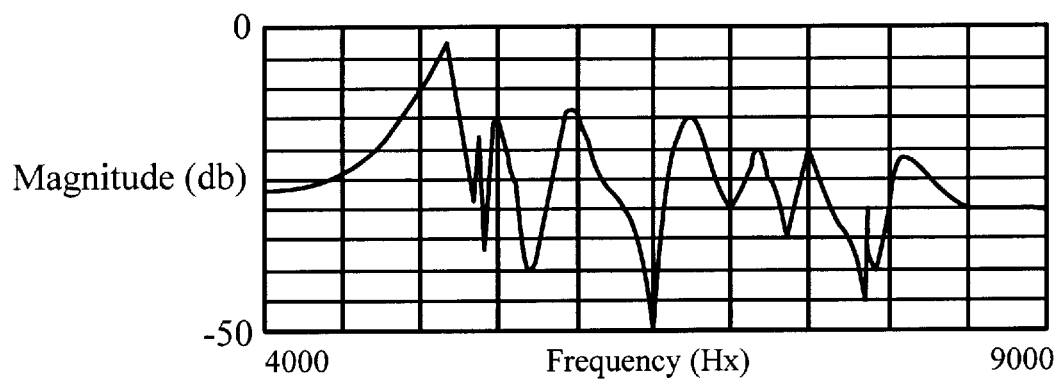
FIGS. 5a–b are graphs showing the mechanical motion of the slider attached to the PZT.
Figure 5B:
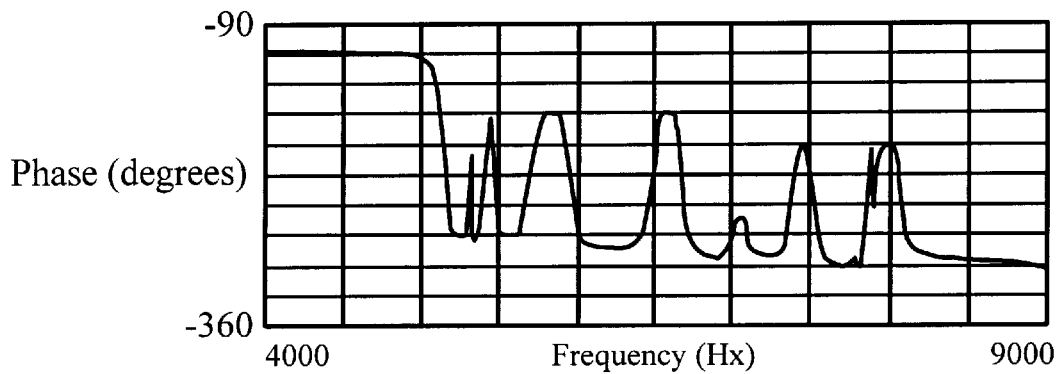
Figure 6A:
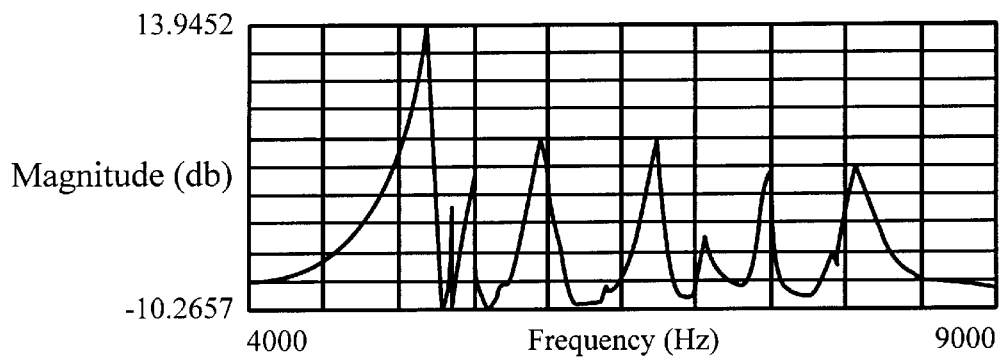
FIGS. 6a–b are graphs showing the measured PZT current while actuating the PZT.
Figure 6B:
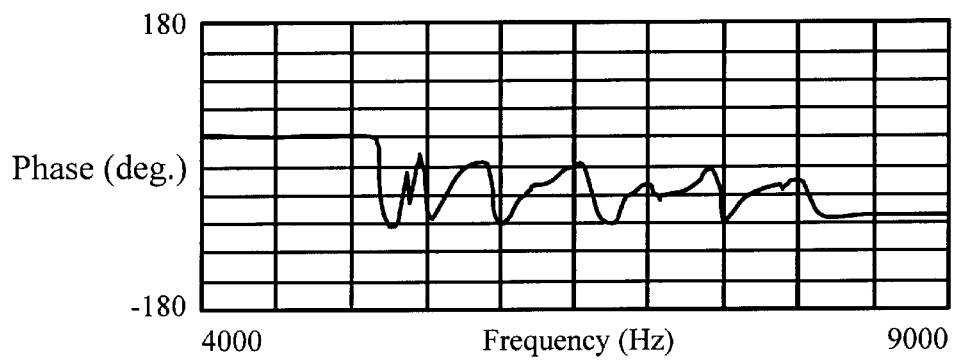
Figure 7A:
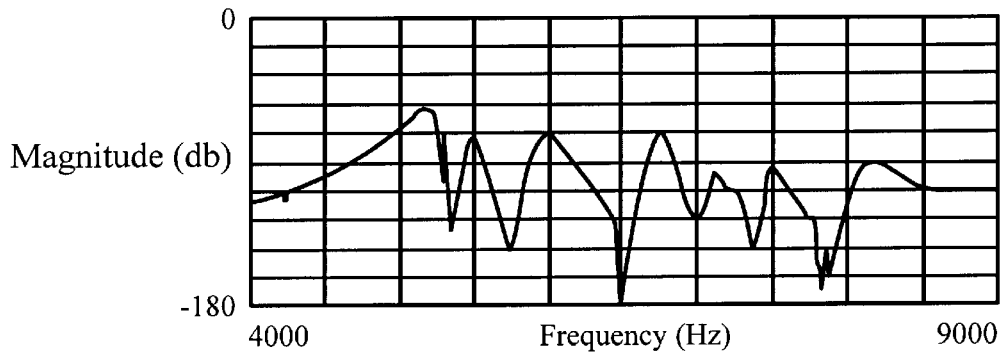
FIGS. 7a–b are graphs showing the mechanical characteristics of the PZT using the sensed current to compensate for the arm assembly's vibrational modes.
Figure 7B:
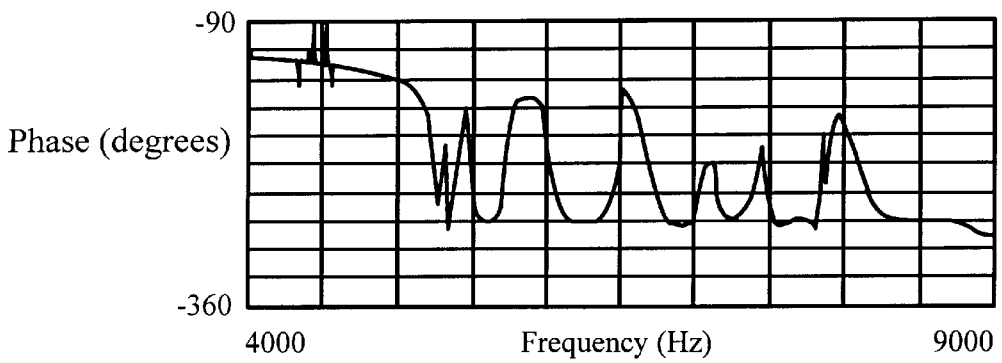

The graphs in FIGS. 5a–b show the magnitude and phase, respectively of the mechanical motion of slider 34 as shown in FIG. 4. The graphs in FIGS. 6a–b illustrate the magnitude and phase, respectively of the current from PZTs 10, 12 during actuation as obtained from bridge circuit 64. Finally, the graphs in FIGS. 7a–b show the damping achieved by the system of the invention. As compared to FIG. 4, the principal mode of arm assembly 16 is damped by about 12 dB.

The system and method of the invention are simple and permit the user to achieve precise simulation of a PZT element mounted on an arm. Moreover, this simulation is very responsive to small changes and allows to adjust the simulated element rapidly. In implementations in a disk drive system the invention allows one to compensate for the arm's vibrational modes and thus increase the operating bandwidth of the arm assembly. This, in turn, allows to operate the system with storage media exhibiting a considerably higher trackpitch.

It will be clear to one skilled in the art that the above embodiment may be altered in many ways without departing from the scope of the invention. Accordingly, the scope of the invention should be determined by the following claims and their legal equivalents.

What is claimed is:

1. A system for actuating and sensing a displacement of an arm assembly using a piezoelectric actuator mounted on said arm assembly, said system comprising:
    a) a high-frequency source for generating a high-frequency excitation;
    b) a control for generating a control signal for actuating said piezoelectric actuator;
    c) a driving stage in communication with said high-frequency source, with said control and with said piezoelectric actuator for combining and applying said high-frequency excitation and said control signal to said piezoelectric actuator, said control signal and said high-frequency excitation causing said displacement and producing an electrical response signal from said piezoelectric actuator; and
    d) a bridge circuit in communication with said driving stage and said piezoelectric actuator for receiving said electrical response signal and deriving said displacement, said bridge circuit comprising a voltage-controlled element for simulating said piezoelectric actuator.

2. The system of claim 1, wherein said voltage-controlled element comprises a voltage-controlled capacitor and a voltage-controlled resistor.

3. The system of claim 1, wherein said bridge circuit has a reference arm and an actuator arm, said reference arm comprising said voltage-controlled element, and said actuator arm comprising said piezoelectric actuator.

4. The system of claim 3, wherein said reference arm further comprises a high-frequency difference amplifier for deriving an adjustment signal and for delivering said adjustment signal to said voltage-controlled element.

5. The system of claim 1 further comprising a compensating circuit in communication with said bridge circuit and with said driving stage for deriving a compensation signal and for delivering said compensation signal to said driving stage.

6. The system of claim 5 wherein said compensation signal has at least one correction component selected from the group consisting of damping correction, stiffening correction and inertia correction.

7. The system of claim 1 wherein said high-frequency excitation is above resonant modes of said arm assembly.

8. The system of claim 1 wherein said piezoelectric actuator is a secondary actuator.

9. The system of claim 1 further comprising a magnetic disk storage medium and said arm assembly comprising a head for reading and writing data in said storage medium.

10. A method for actuating and sensing a displacement of an arm assembly by a piezoelectric actuator mounted on said arm assembly, said method comprising the following steps:
    a) generating a high-frequency excitation;
    b) generating a control signal;
    c) combining said high-frequency excitation and said control signal and applying said high-frequency excitation and said control signal to said piezoelectric actuator, said control signal and said high-frequency excitation causing said displacement and producing an electrical response signal from said piezoelectric actuator;
    d) deriving said displacement from said electrical response signal; and
    e) providing a bridge circuit comprising a voltage-controlled element for producing a simulated response signal from said high frequency excitation and said control signal;

f) comparing a difference between said response signal and said simulated response signal; and g) adjusting said voltage control element to reduce said difference between said response signal and said simulated response signal.

11. The method of claim 10 further comprising the step of deriving a compensation signal from said response signal and delivering said compensation signal to said piezoelectric actuator.

12. The method of claim 11 wherein said compensation signal has at least one correction component selected from the group consisting of damping correction, stiffening correction and inertia correction.

13. The method of claim 10 wherein said piezoelectric actuator is used as a secondary actuator of said arm assembly.

* * * * *